(12) United States Patent
Pasternak

(10) Patent No.: US 10,027,161 B2
(45) Date of Patent: Jul. 17, 2018

(54) ULTRA-SLIM INDUCTIVE CHARGING

(71) Applicant: ADVANCED WIRELESS INNOVATIONS LLC, Santa Monica, CA (US)

(72) Inventor: Shawn Pasternak, Simi Valley, CA (US)

(73) Assignee: Advanced Wireless Innovations LLC, Santa Monica, CA (US)

( * ) Notice: Subject to any disclaimer, the term of this patent is extended or adjusted under 35 U.S.C. 154(b) by 0 days.

(21) Appl. No.: 15/400,933

(22) Filed: Jan. 6, 2017

(65) Prior Publication Data

US 2017/0194808 A1    Jul. 6, 2017

Related U.S. Application Data

(60) Provisional application No. 62/275,768, filed on Jan. 6, 2016.

(51) Int. Cl.
*H02J 7/02* (2016.01)
*H02J 50/12* (2016.01)
*H02J 50/10* (2016.01)

(52) U.S. Cl.
CPC .............. *H02J 7/025* (2013.01); *H02J 50/10* (2016.02); *H02J 50/12* (2016.02)

(58) Field of Classification Search
None
See application file for complete search history.

(56) References Cited

U.S. PATENT DOCUMENTS

| | | | | |
|---|---|---|---|---|
| 2010/0109445 A1* | 5/2010 | Kurs | ...................... | B60L 11/007 307/104 |
| 2010/0127660 A1* | 5/2010 | Cook | ...................... | H01Q 1/248 320/108 |
| 2012/0086394 A1 | 4/2012 | Hui | | |
| 2013/0020875 A1* | 1/2013 | Wozniak | ............... | H01M 10/46 307/72 |
| 2016/0164335 A1* | 6/2016 | Kanahara | .............. | H02J 7/0044 320/108 |
| 2017/0179766 A1* | 6/2017 | Zeine | ...................... | H02J 50/10 |

FOREIGN PATENT DOCUMENTS

| | | |
|---|---|---|
| JP | 2014 033546 A | 2/2014 |
| WO | WO-2010/022181 A1 | 2/2010 |
| WO | WO-2010/036980 A1 | 4/2010 |
| WO | WO-2012/002957 A1 | 1/2012 |

* cited by examiner

*Primary Examiner* — David Bilodeau
(74) *Attorney, Agent, or Firm* — Mintz Levin Cohn Ferris Glovsky and Popeo, P.C.

(57) ABSTRACT

A base station for providing inductive transfer of energy to a mobile device that includes a base unit having an inductive transmitter coil configured to generate an electromagnetic field in response to an electrical charge being applied to the inductive transmitter coil with an adapter separate from the base unit. The adapter can include an inductive charging circuitry for controlling the current transmitted through the inductive transmitter coil.

12 Claims, 9 Drawing Sheets

ULTRA-SLIM INDUCTIVE CHARGING

CROSS-REFERENCE TO RELATED APPLICATIONS

This application claims prior to and the benefit of U.S. Provisional Patent Application No. 62/275,768, entitled "ULTRA-SLIM INDUCTIVE CHARGING" which is incorporated herein by reference in its entirety.

TECHNICAL FIELD

The subject matter described herein relates to inductive charging.

BACKGROUND

Inductive charging uses electromagnetic fields to transfer energy between two objects. Energy is transmitted through an inductive coupling to an electrical device, which can, in turn, use that energy to charge batteries within a device or run the device.

Inductive chargers typically use an induction coil to create an alternating electromagnetic field from within a charging base, and a second induction coil in a portable device that takes power from the alternating electromagnetic field and converts it back into electric current. This electric current is then typically used to charge a battery within the device.

SUMMARY

In one aspect, a base station is provided for providing inductive transfer of energy to a mobile device that includes a base unit having an inductive transmitter coil configured to generate an electromagnetic field in response to an electrical charge being applied to the inductive transmitter coil with an adapter separate from the base unit. The adapter can include an inductive charging circuitry for controlling the current transmitted through the inductive transmitter coil.

Described is a base station for providing inductive transfer of energy to a mobile device. The base unit can include an inductive transmitter coil configured to generate an electromagnetic field in response to an electrical charge being applied to the inductive transmitter coil. The adapter can be separate from the base unit. The adapter cam include an inductive charging circuitry for controlling the current transmitted through the inductive transmitter coil. The inductive charging circuitry can include a circuit board having electrical components for controlling the current transmitted through the inductive transmitter coil. The adapter can comprise a plug.

The base station can include a cable connecting the base unit to the adapter separate from the base unit. The base unit can include additional inductive transmitter coils disposed off-set from one another. The base unit can comprise at least three transmission coils. At least one transmission coil of the at least three transmission coils can be disposed to overlap with two other transmission coils.

The details of one or more variations of the subject matter described herein are set forth in the accompanying drawings and the description below. Other features and advantages of the subject matter described herein will be apparent from the description and drawings, and from the claims. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
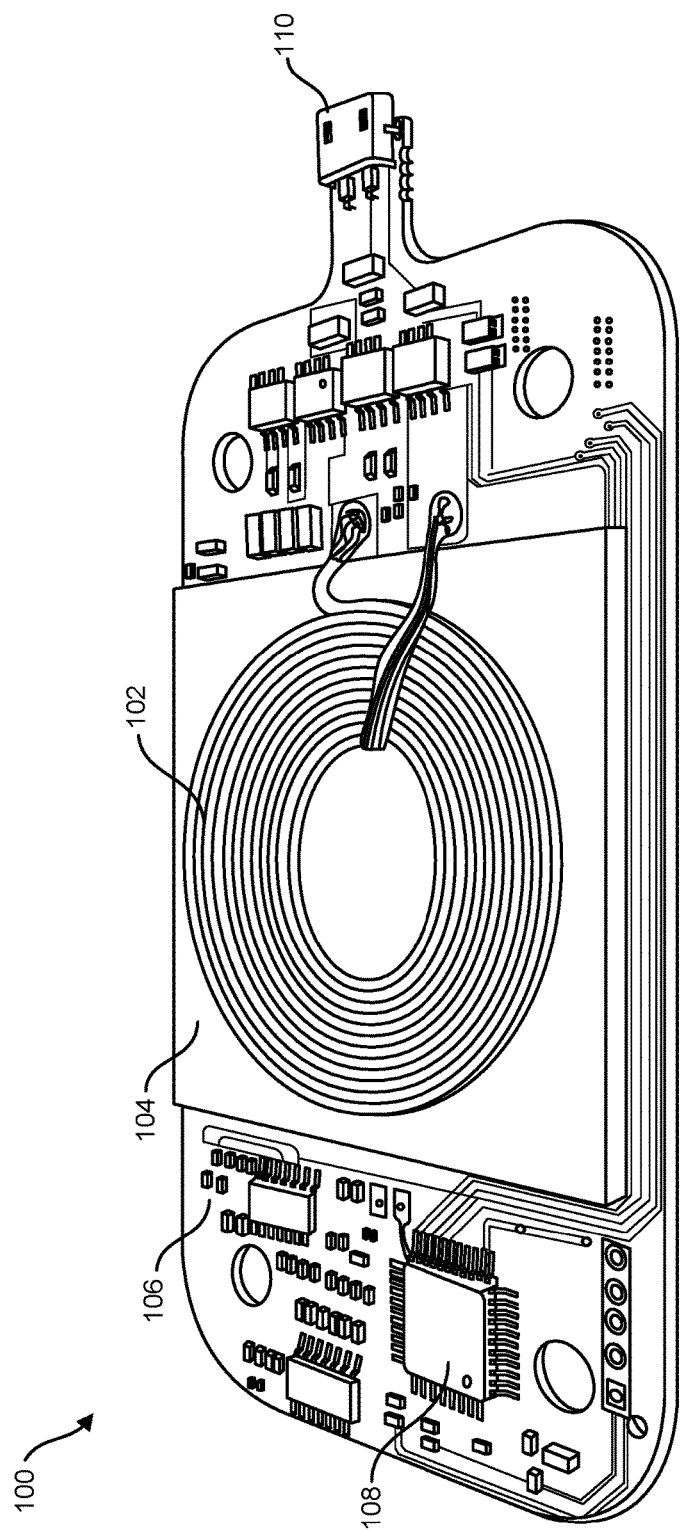
FIG. 1 is an illustration of a typical inductive charging base station.

FIG. 1 is an illustration of a typical inductive charging base station 100. The typical inductive charging base station 100 can include an inductive wire coil 102. The inductive wire coil 102 can be configured to convert alternating electrical to an electromagnetic field. The typical inductive charging base station 100 typically includes a magnetic base 104 supporting the wire coil 102. The magnetic base 104 is typically attached to an electrical circuit 106. The electrical circuit 106 can include a circuit board. The electrical circuit 106 can include one or more electrical components 108 for controlling the magnetic field produced by the inductive wire coil 102. A plug 110 can be electrically connected to the electrical circuit 106. The plug 110 may be a USB plug configured to engage with a USB port for receiving power through a powered USB port, or the like.

The electrical circuit 106 can also include a power inverter for to change direct current (DC) received through a USB port into alternating current (AC).

Figure 2:
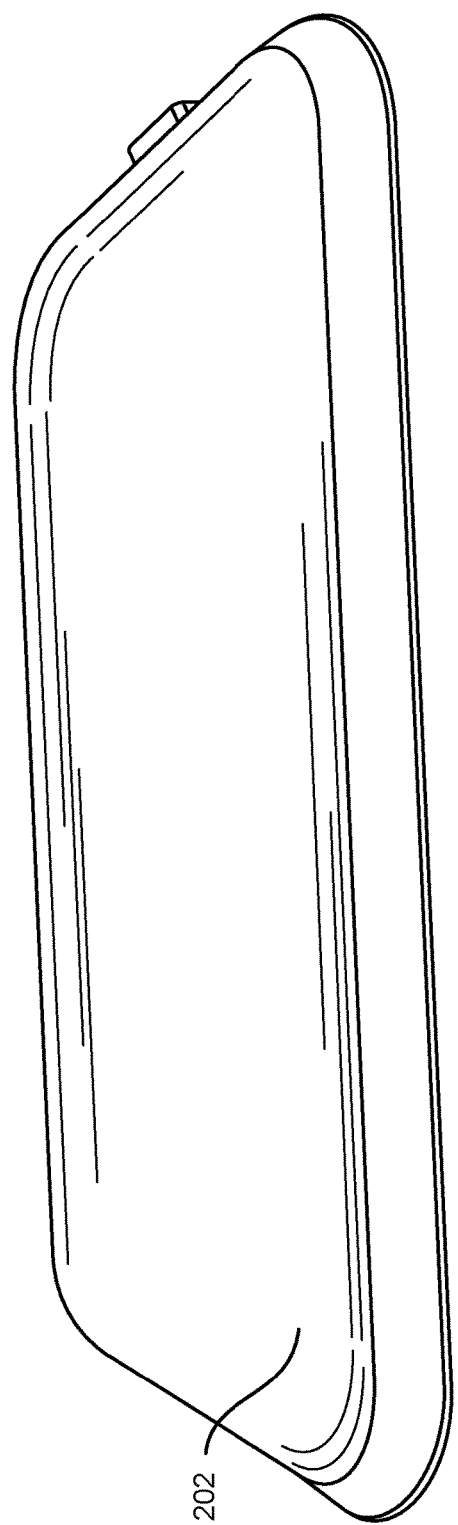
FIG. 2 is an illustration of a housing for a typical inductive charging base station, as illustrated in FIG. 1.

FIG. 2 is an illustration of a housing 202 for a typical inductive charging base station 100, as illustrated in FIG. 1. Having all of the elements stacked in the housing 202 can cause undesirable increase in temperature that can harm the components of the inductive charging base station 100, a mobile device being charged by the inductive charging base station 100, a surface supporting the inductive charging base station 100, or the like. Heat can be generated by the electrical components of the inductive charging system 100. A power inverter, for example, can produce a particularly large amount of heat.

The electrical circuit 106 can be configured to facilitate modification of the strength of the electromagnetic field being generated by the wire coil 102. Communication signals can also be transmitted between the inductive charging base station 100 and a mobile device being charged by the inductive charging base station 100. When the temperature increases to a certain level, the mobile device can send a signal to the inductive charging base station 100 requesting less energy in an attempt to avoid increase in the temperature. This can prolong the charging time required to charge up the mobile device.

Furthermore, the components stacked into the housing 202 can result in an inductive charging base station 100 with an undesirable weight.

Figure 3:
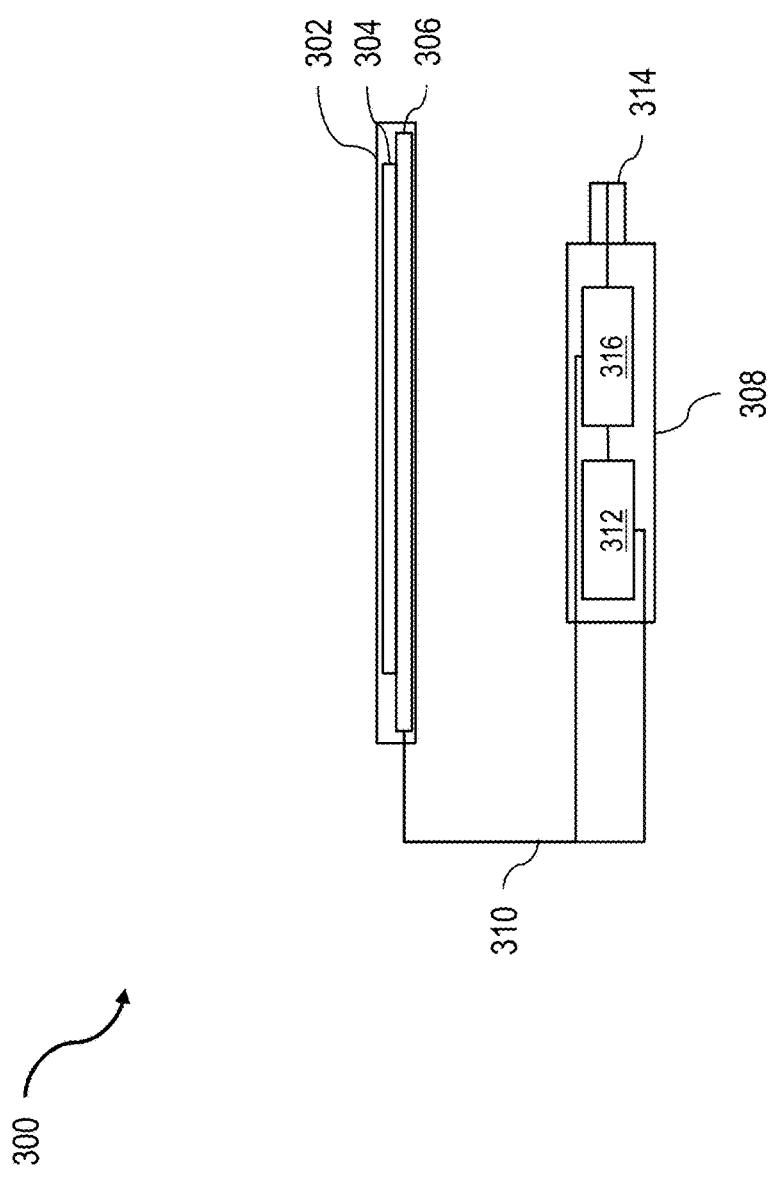
FIG. 3 is an illustration of an inductive charging system having one or more elements consistent with the present subject matter.

FIG. 3 is an illustration of an inductive charging system 300 having one or more elements consistent with the present subject matter. The inductive charging system 300 can include a base unit 302. The base unit 302 can include one or more components of the inductive charging system 300. The base unit 302 can be configured to allow an electromagnetic field to transmit beyond the base unit housing to energize a corresponding wire coil in a mobile device in proximity to the base unit 302.

The base unit 302 can comprise at least one inductive transmitter coil 304. The inductive transmitter coil 304 can be configured to generate an electromagnetic field in response to an electrical charge being applied to the inductive transmitter coil. The inductive transmitter coil 304 can be mounted onto a ferrous substrate 306. In some variations, the ferrous substrate 306 can be included within the housing of the base unit 302. In some variations, the ferrous substrate 306 can form at a portion of at least one side of the base unit 302, forming at least part of the housing for the base unit 302.

The inductive charging system 300 can include an adapter 308. The adapter 308 can be separate from the base unit 302. The adapter 308 can include one or more components contained in an adapter housing. The adapter housing can be a separate structure to the base unit housing. The adapter 308, while separate from the base unit 302, can be connected to the base unit 302 with an electrical cable 310. The electrical cable 310 can be fixed between the base unit 302 and the adapter 308. In some variations, the electrical cable 310 can be removable from the base unit 302 and/or the adapter 308, for example, the cable 310 can be a USB cable, or the like, plugged into the base unit 302 and/or the adapter 308.

The adapter 308 can include an inductive charging circuitry 312. The inductive charging circuitry 312. The inductive charging circuitry 312 can be configured to monitor the inductive transmitter coil 304. The inductive charging circuitry 312 can be configured to control the electrical current applied to the inductive transmitter coil 304.

The adapter 308 can include a plug 314. The plug 314 can take on any one of a multitude of plug form factors. Plug form factors can include, for example, USB A, USB Type C, AC power adapter, Car Charger (CLA), or other form factors. The adapter 308 can have a form factor that complements the form factor of the plug 314. For example, the form factor for the adapter 308 having a USB type plug can resemble a USB type form factor, the form factor for the adapter 308 having a wall-socket plug can resemble a wall-socket plug form factor, or transformer type form factor. The inductive charging circuitry 312 can include a circuit board. The circuit board can include electrical components for controlling the current transmitted through the inductive transmitter coil.

Figure 4:
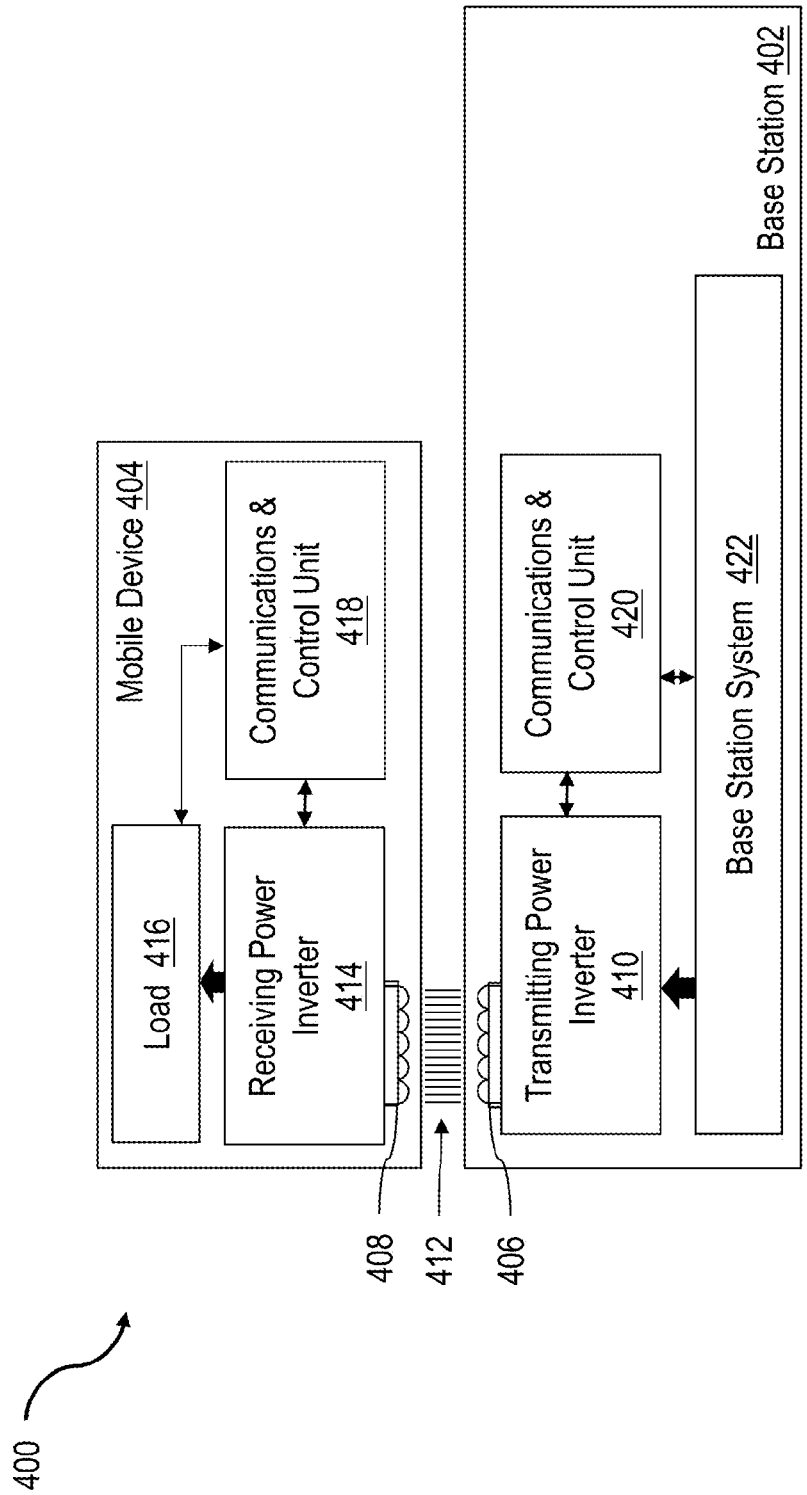
FIG. 4 is an illustration of an induction charging system having one or more features consistent with the present description.

FIG. 4 is an illustration of an induction charging system 400 having one or more features consistent with the present description. The induction charging system 400 can be configured to have an inductive coupling between a base station 402 and a mobile device 404 in order to charge the mobile device 404 from the base station 402. The base station 402 can include one or more transmitting coils 406 and the mobile device 404 can include a receiving coil 408. The transmitting coil(s) 406 and the receiving coil 408 can be planar coils.

The base station 402 can include a transmitting power inverter 410. The transmitting power inverter 410 can be configured to convert DC electric charge to an AC electric charge. The power inverter 410 can be electrically coupled with the transmitting coil 408. The AC electric charge applied to the transmitting coil 406 can generate an oscillating magnetic field 412 between the transmitting coil 406 and the receiving coil 408. The oscillating magnetic field 412 induces an alternating current in the receiving coil 408. The alternating current being generated due to the effects described by Faraday's law of induction. Various shields and magnetic or ferrous materials can be incorporated into the base station 402 and the mobile device 404 to ensure efficient power transfer between the base station 402 and the mobile device 404.

The mobile device 404 can include a receiving power inverter 414. The receiving power inverter 414 can be configured to convert AC electric charge generated at the receiving coil 408 into DC electric charge. The mobile device 404 can include a load 416. The load 416 can be one or more electrical components of the mobile device 404. The load 416 of the mobile device 404 can be a battery of the mobile device 404.

The communications and control unit 418 of the mobile device 404 can be configured to regulate the request for power from the base station 402 based on the requirements of the load 416 of the mobile device 404. Communication between the base station 402 and the mobile device 404 can facilitate through the receiving coil 408 and the transmitting coil 406. The communication can be unidirectional from the receiving coil 408 to the transmitting coil 406. The communication can be performed through backscatter modulation. The receiver coil 408 is loaded, changing the current draw at the transmitter coil 406. The current changes at the transmitter coil 406 can be monitored and demodulated by the communications and control unit 420 of the base station 402. The communications and control unit 420 can be configured to cause the base station 402 to regulate the transmitted power based on the request from the mobile device 404.

The base station 402 can include multiple transmission coils. To charge the mobile device 404 the mobile device 404 would need to be positioned on the base station 402 in a manner that will allow the mobile device 404 to be charged. One way to position the mobile device 404 on the base station 402 is through guided positioning to align the receiving coil 408 of the mobile device 404 with the transmitting coil 406 of the base station 402. The mobile device 404 can be configured to provide guidance for the positioning of the base station 402. Another way to position the mobile device 404 is with free positioning. Free positioning does not require the mobile device 404 to be positioned such the that the receiving coil 408 is aligned with the transmitting coil 406. Free positioning can be achieved through using a bundle of transmitting coils at different locations and then regulated by the base station 402, such as by a base station system 422 for generating an alternating magnetic field in the vicinity of the receiving coil 408. Another method to achieve free positioning is through multiple cooperative flux generators.

Figure 5:
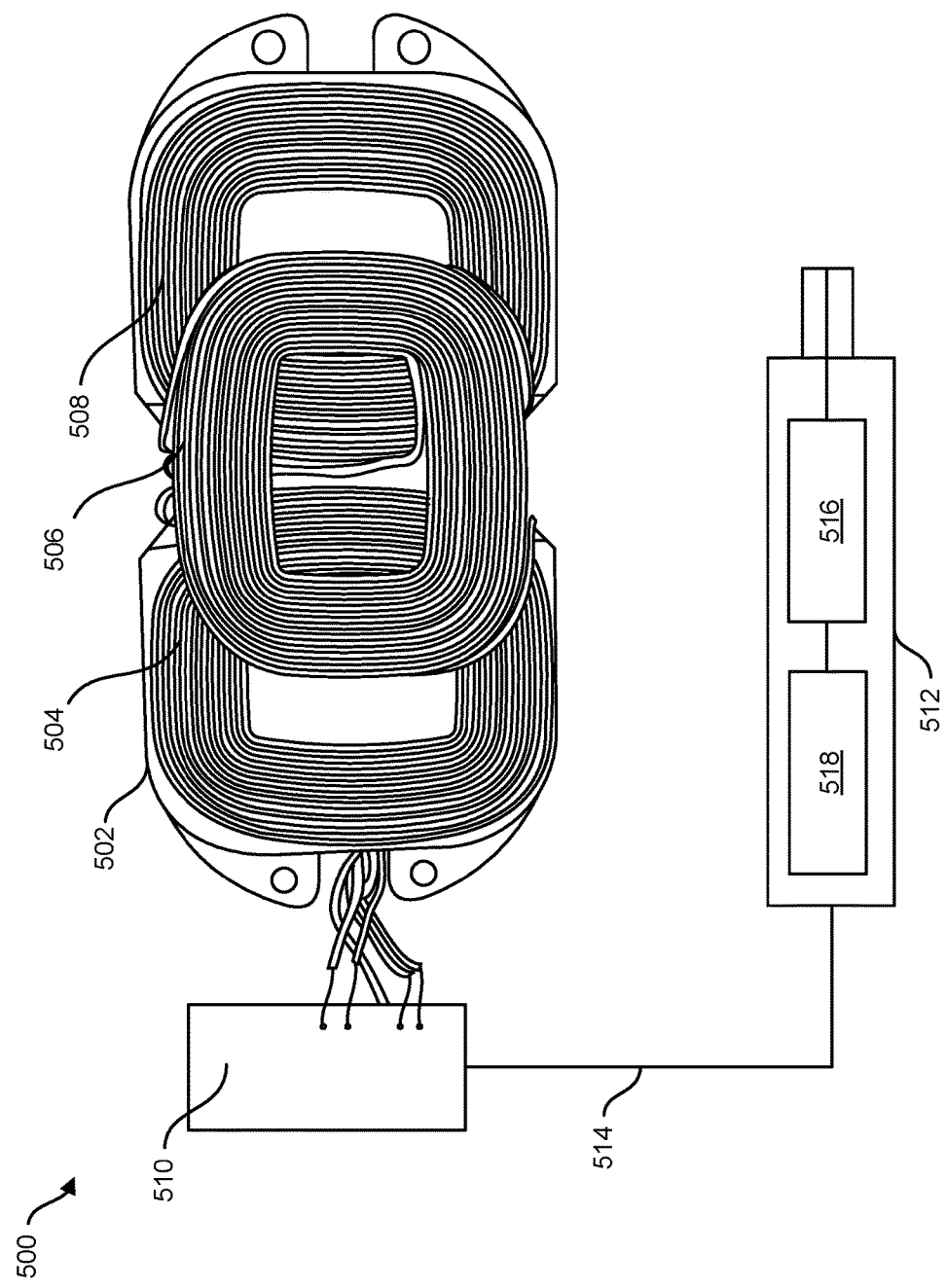
FIG. 5 is an illustration of a base station with multiple transmitting coils having one or more elements consistent with the present description.

FIG. 5 is an illustration of a base station 500 with multiple transmitting coils having one or more elements consistent with the present description. The base station 500 can include a substrate 502. The substrate 502 can be magnetic material, ferrous material, or the like. The substrate 502 can be configured to increase the efficiency of the induction of the base station 500. The base station 500 can include a plurality of transmission coils 504, 506 and 508.

In some variations the base station 500 can be coupled to an adapter 512 with a cable 514. The adapter 514 can include a communication and control unit 516. The communication and control unit 516 can be configured to compute the required power requirements for each of the plurality of transmission coils 504, 506 and 508. The cable 514 can include a plurality of wires and the correct power requirements can be transmitted through each of the wires to the correct transmission coil.

In some variations, one or more power inverters 518 that provide alternating current to the transmission coils of the base station 500 can be disposed within the adapter 514 that is separate from the base station 500. The one or more power inverters 518 can transmit the power to the one of a plurality of coils 504, 506 and 508 through cable 514. Cable 514 can have a plurality of wires.

In some variations, the base station 500 can include a daughter electric circuit 510. The daughter electric circuit 510 can be configured to perform some, or all, of the calculations for the determining the power requirements for each of the plurality of transmission coils 504, 506 and 508. The daughter electric circuit 510 can be configured to cause activation of the appropriate transmission coil 504, 506 and 508 for providing induction power to the receiving coil of the mobile device.

Figure 6:
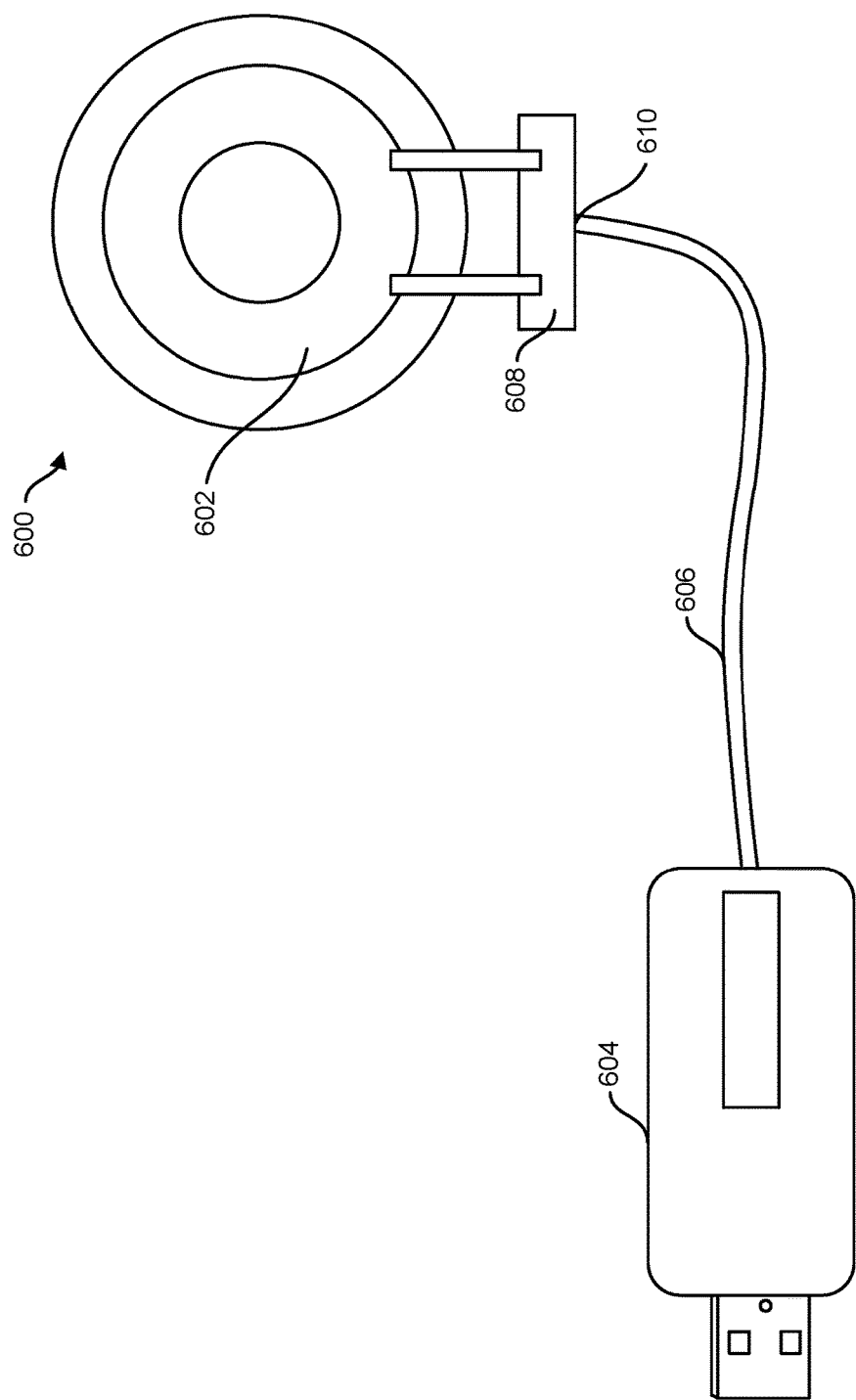
FIG. 6 is an illustration of a base station having one or more elements consistent with the present description.

FIG. 6 is an illustration of a base station 600 having one or more elements consistent with the present description. The base station 600 can include a single transmission coil 602, as illustrated. The transmission coil 602 can be electrically coupled to an adapter 604, through cable 606. The adapter 604 can be a DC power adapter, USB power adapter, or the like.

In some variations, the transmitting power inverter, the communications and control unit, the base station system, and the like, can be disposed within the adapter 604. In some variations, one or more electrical components can be disposed on a daughter electrical circuit 608. The daughter electrical circuit 608 can have one or more electrical components configured to compute and deliver the required electrical power to the transmission coil 602.

The cable 606 can include a connector 610. The connector 610 can be configured to connect with the base station 600. The base station 600 can include a socket complementary to the connector 610. The cable 606 and connector 610 can be configured to facilitate transmission of power from the adapter 604 to the base station 600.

Figure 7:
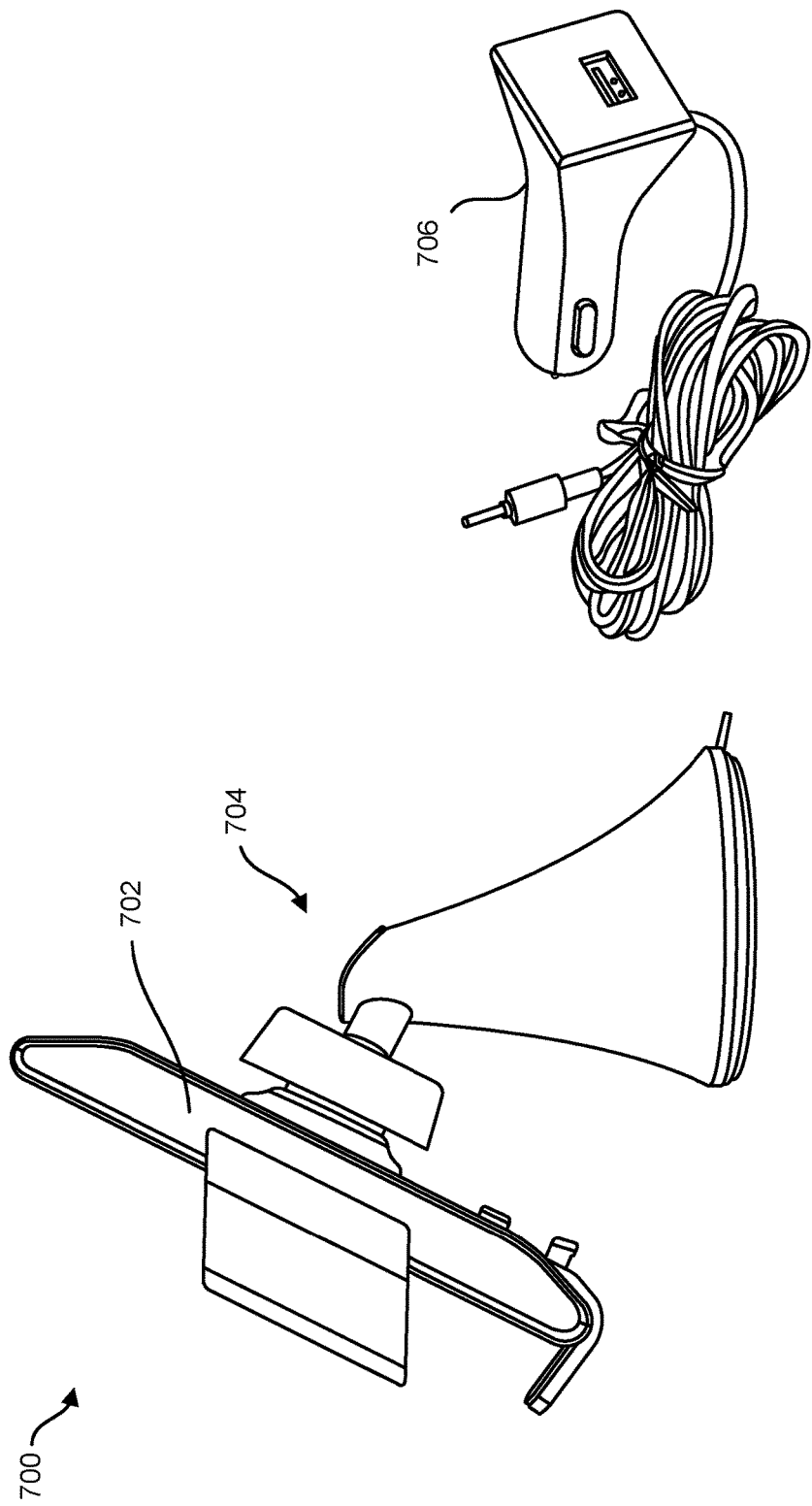
FIG. 7 is an illustration of an inductive charging system for use in a vehicle having one or more elements consistent with the present description.

FIG. 7 is an illustration of an inductive charging system 700 for use in a vehicle having one or more elements consistent with the present description. The charging system 700 can include a base station 702 integrated into a car mount 704 for a mobile device. The transmission power inverter, base station communication and control unit, and other electrical components can be disposed within the car charger (CLA) 706. In some variations, simple logic boards can be disposed within the base station 702. The simple logic boards can be configured to distribute the power from the transmission power inverter to the appropriate transmission coils for providing inductive power to the mobile device.

Figure 8:
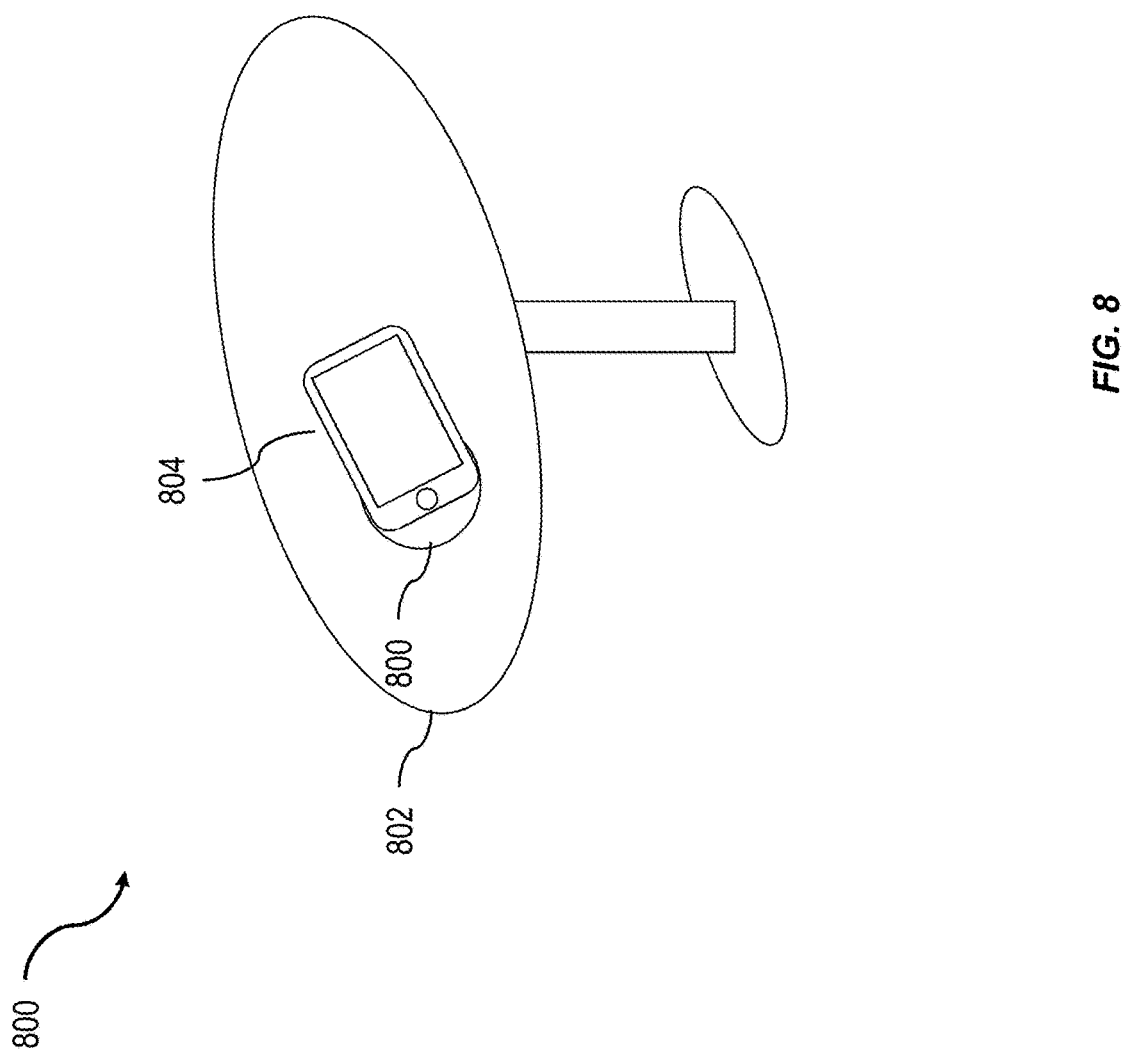
FIG. 8 is an illustration of a user of an inductive charging system having one or more features consistent with the present description; and, FIG. 9 illustrates a method having one or more features consistent with then current subject matter.

A non-limiting feature of the presently described inductive charging system includes providing a base station with a reduced profile allowing the base station to be placed onto a surface, such as a table, without the need to drill a hole, or recess, into the table. FIG. 8 is an illustration of a user of an inductive charging system having one or more features consistent with the present description. The base station 800 can be placed on top of the table 802. A mobile device 804, configured to be charged through inductive charging, can be placed directly onto the table 802 where the mobile device 804 is also position on the base station 800 to be charged.

A non-limiting feature of the presently described inductive charging system includes providing a base station having reduced weight thereby facilitating sticking the base station to the underside of a surface, such as a table. The base station can comprise an adhesive patch. The adhesive patch can be configured to facilitate sticking the base station to the underside of a table, for example. The reduced weight of a base station having one or more elements consistent with the present description can allow the base station to remain stuck to the underside of a table surface without being pulled off under its own weight.

A non-limiting feature of the presently described inductive charging system includes providing a base station integrated with a mobile device vehicle mount having a smaller profile and reduced weight. A smaller profile provides better visibility for a driver. A reduced weight reduced the forces exerted onto the pad of the vehicle mount thereby reducing the likelihood of the mobile device vehicle mount detaching from the vehicle.

In some variations, items, such as tables, walls, floors, or the like, can be provided with resonant wireless power. A base station having one or more features consistent with the present description can be provided. Resonant wireless power can include loose coupling or RF. The base station can be configured to adapt the resonant wireless power to inductive wireless power, which has tighter coupling, coil-to-coil power transfer. In one example, the base station can resemble a drink coaster. The base station can be powered wirelessly via resonant power, and the user could set their mobile device on that "coaster" to charge.

Figure 9:
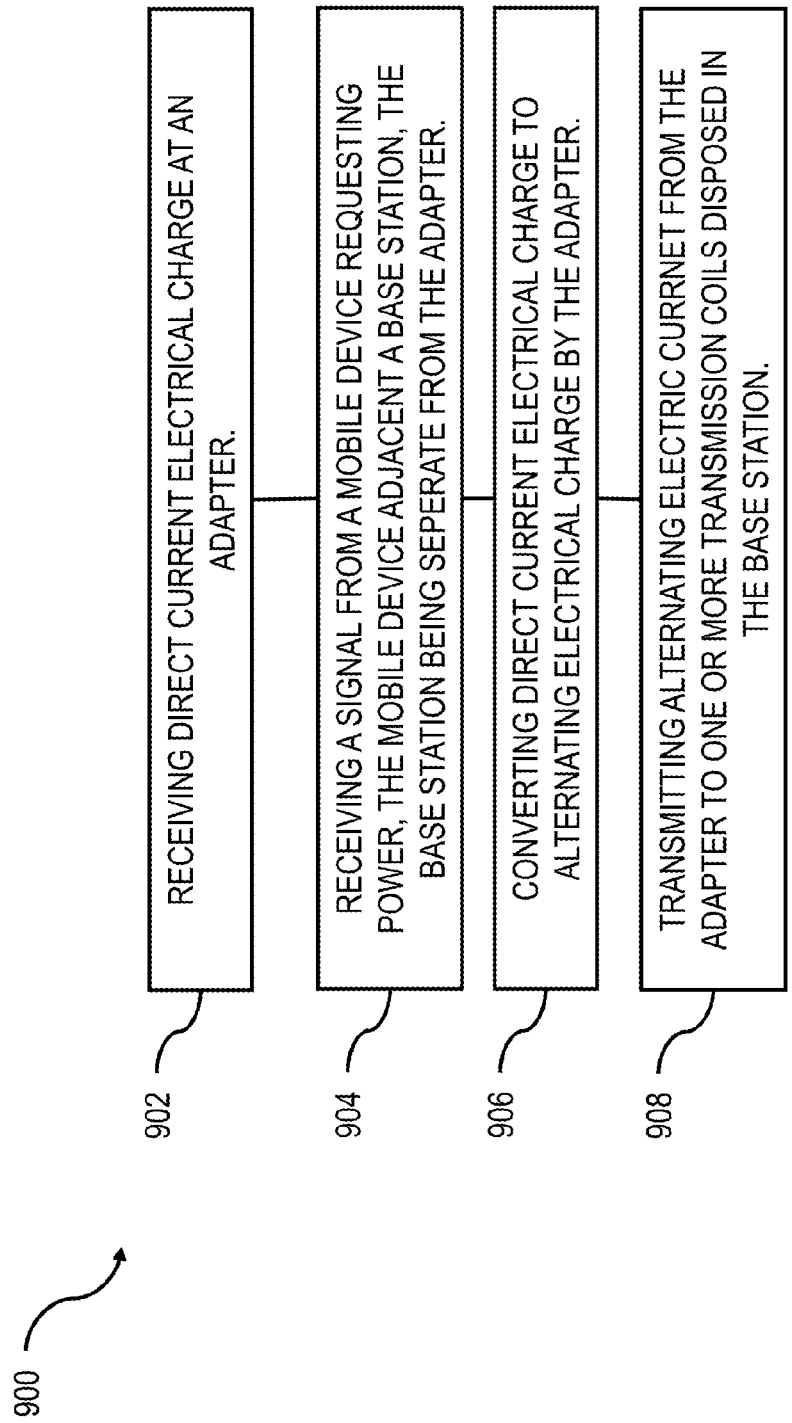

FIG. 9 illustrates a method 900 having one or more features consistent with then current subject matter. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting. Method 900 can be a method of providing power wirelessly to a mobile device through inductive charging.

At 902, direct current electrical charge can be received at an adapter. The adapter can be separate from a base station.

At 904, a signal can be received from a mobile device requesting power. The mobile device can be adjacent a base station. The base station can be separate from the adapter. The requested power can have at least one power characteristic.

At 906, direct current electrical charge can be converted to alternating current electrical charge by the adapter.

At 908, the alternating current electrical charge can be transmitted to one or more transmission coils disposed within the base station. The electrical charge can be transmitted through a cable electrically coupled to the adapter and the base station. The alternating electrical charge received at the transmission coil(s) can cause an alternating magnetic field to be generated that excites a receiving coil in the mobile device.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A base station for providing inductive transfer of energy to a mobile device comprising:
    a base unit comprising a first inductive transmitter coil and a second inductive transmitter coil, the first inductive transmitter coil configured to provide a first quantity of inductive power by at least generating a first electromagnetic field in response to an electrical charge being applied to the inductive transmitter coil, and the second inductive transmitter coil configured to provide a second quantity of inductive power by at least generating a second electromagnetic field in response to the electric charge being applied to the second inductive transmitter coil; and
    an adapter separate from the base unit, the adapter comprising an inductive charging circuitry for activating, based at least on a power requirement of a load at the mobile device, the first inductive transmitter coil instead of the second inductive transmitter coil, the activation comprising a transmission of the electric charge to the first inductive transmitter coil instead of the second inductive transmitter coil.

2. The base station of claim 1, wherein the inductive charging circuitry includes a circuit board having electrical components for activating the first inductive transmitter coil and/or the second inductive transmitter coil.

3. The base station of claim 1, wherein the adapter comprises a plug.

4. The base station of claim 1, further comprising a cable connecting the base unit to the adapter separate from the base unit.

5. The base station of claim 1, wherein the first inductive transmitter coil and the second inductive transmitter coil are disposed at an off-set from one another.

6. The base station of claim 5, wherein the base unit further comprises a third inductive transmitter coil, and wherein the third inductive transmitter coil overlaps with the first inductive transmitter coil and/or the second inductive transmitter coil.

7. The base station of claim 1, wherein the adapter is disposed in a plug configured to engage with an electrical socket and the base unit is disposed in a dashboard mount for a portable electronic device.

8. The base station of claim 1, wherein the adapter is disposed in a plug configured to engage with an electrical socket and the base unit is disposed in a tabletop.

9. The base station of claim 1, wherein the adapter and the base unit comprise separate components in a portable rechargeable battery.

10. A method comprising:
    receiving, at an adaptor separate from a base unit, a direct current electrical charge, the base unit comprising a first inductive transmitter coil and a second inductive transmitter coil, the first inductive transmitter coil configured to provide a first quantity of inductive power, and the second inductive transmitter coil configured to provide a second quantity of inductive power;
    receiving, from a mobile device and at the base unit, a signal requesting power, the mobile device being adjacent to the base unit; and
    activating, by the adapter, the first inductive transmitter coil instead of the second inductive transmitter coil, the activation based at least on a power requirement of a load at the mobile device, the activation comprising a conversion, by the adapter, of the direct current electrical charge to an alternating electrical charge and a transmission of the alternating electric current from the adapter to the first inductive transmitter coil.

11. The method of claim 10, wherein the base unit and the adapter are connected by an electrical cable.

12. The method of claim 11, wherein the electrical cable is flexible.

* * * * *